Figure 1:
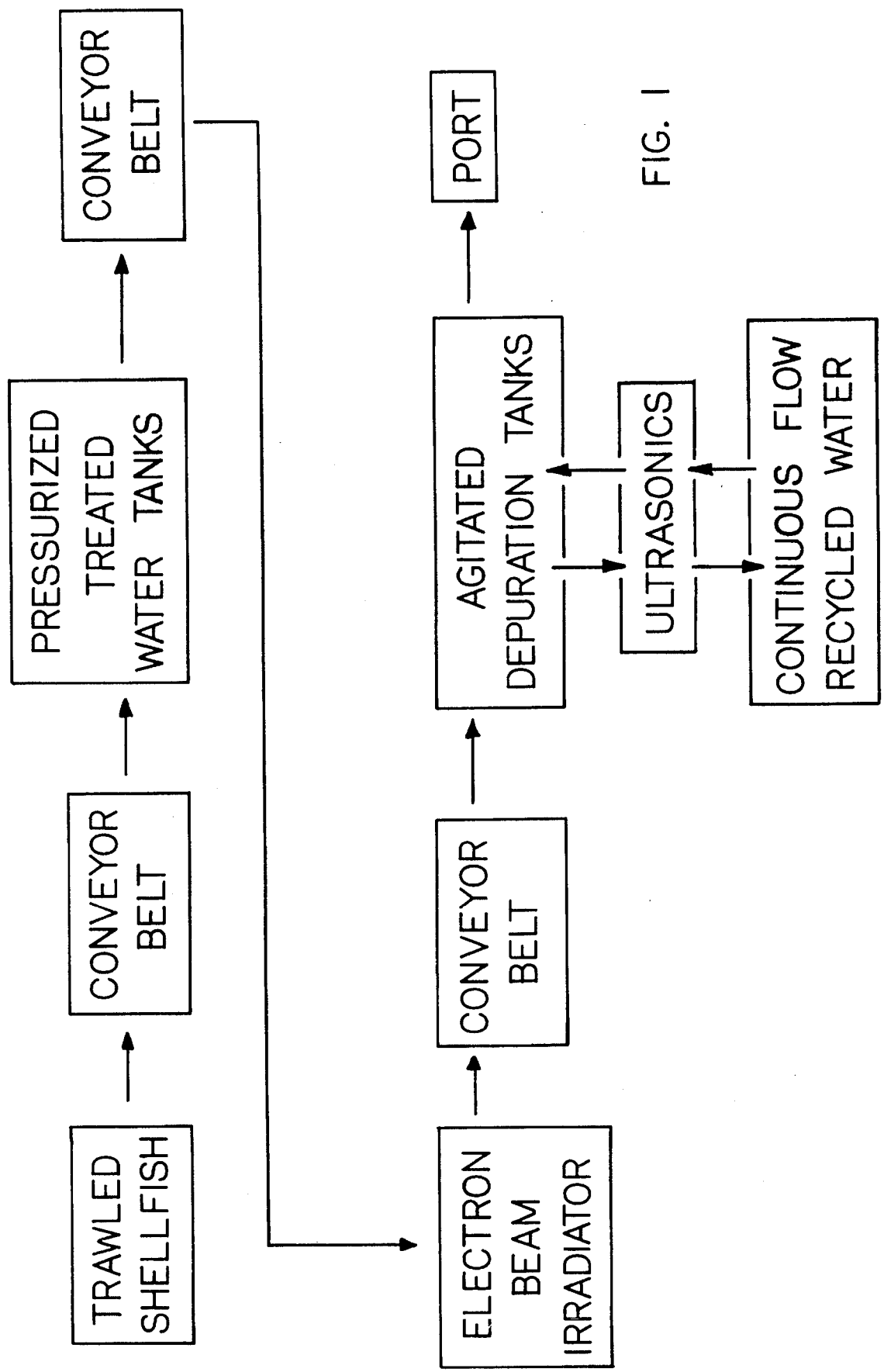
Figure 2:
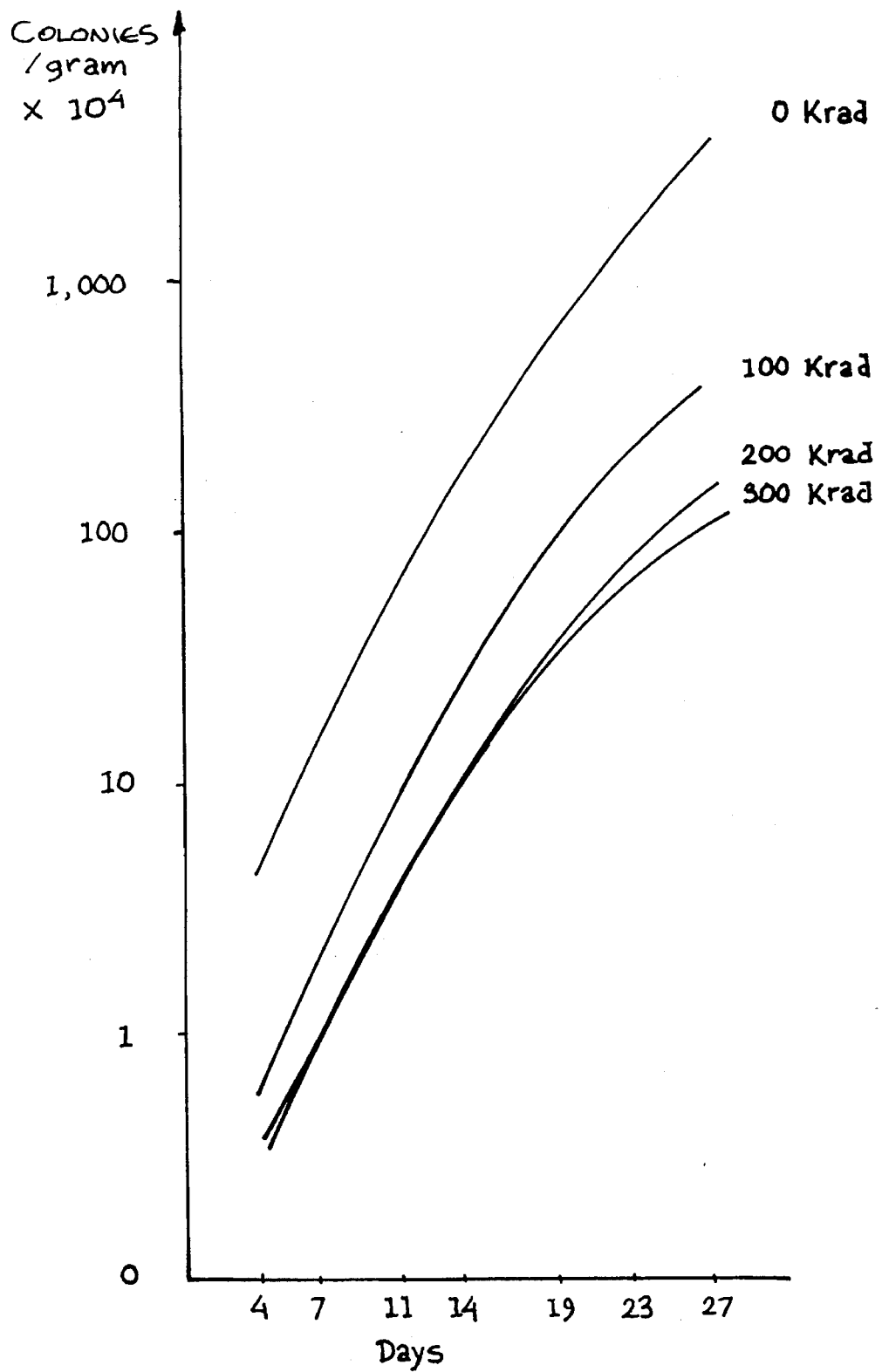
Figure 3:
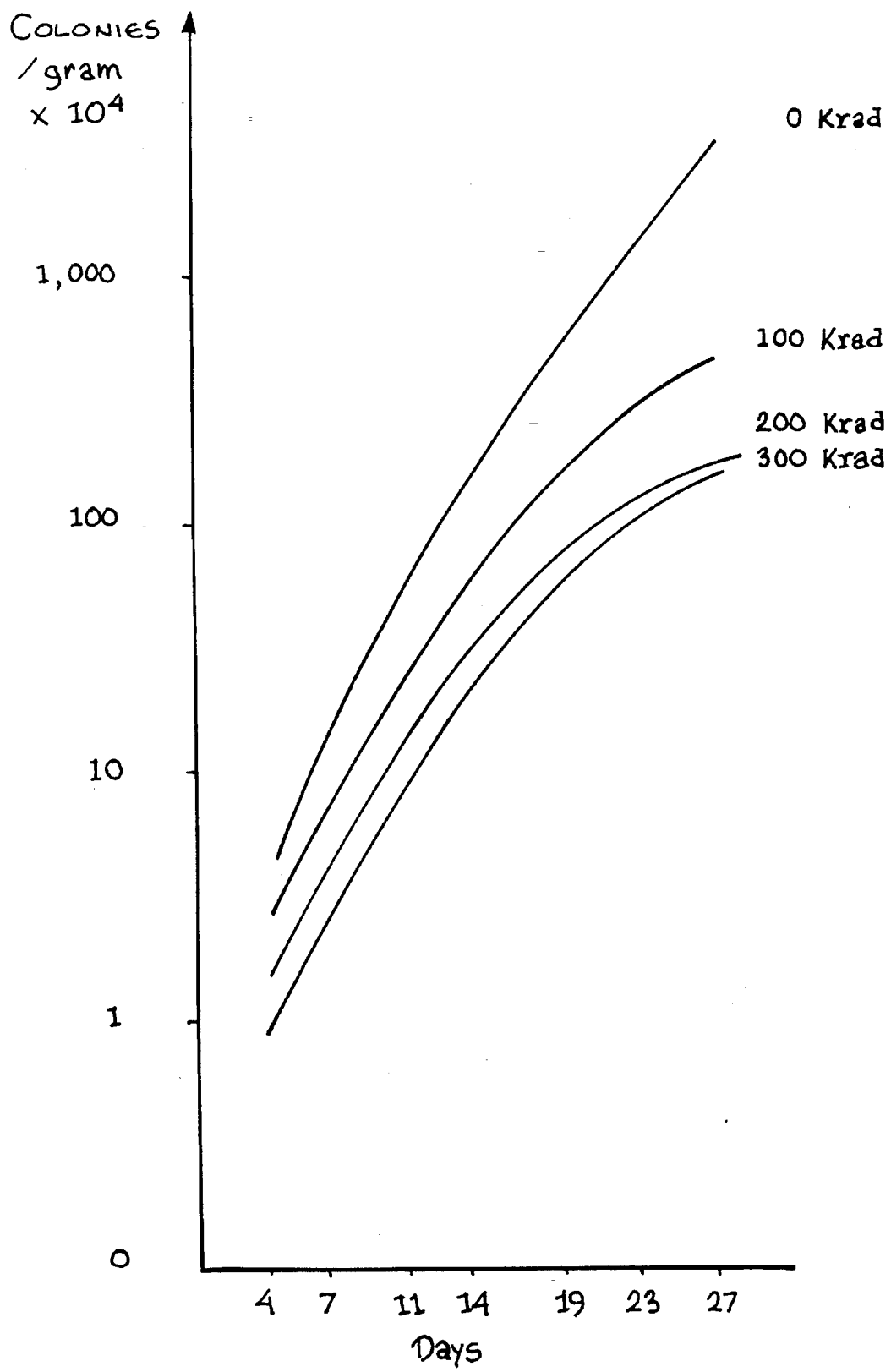

United States Patent
Robinson, Jr.

[11] Patent Number: 5,482,726
[45] Date of Patent: Jan. 9, 1996

[54] METHOD FOR REDUCING CONTAMINATION OF SHELLFISH

[75] Inventor: William L. Robinson, Jr., Baltimore, Md.

[73] Assignee: US Harvest Technologies Corporation, Md.

[21] Appl. No.: 912,410

[22] Filed: Jul. 14, 1992

[51] Int. Cl.⁶ .................................................. A23B 4/00
[52] U.S. Cl. ........................ 426/238; 426/240; 426/506
[58] Field of Search .................................... 426/231, 238, 426/240, 335, 643, 506

[56] References Cited

U.S. PATENT DOCUMENTS

| | | | |
|---|---|---|---|
| 3,594,115 | 7/1971 | Wesley et al. | 426/238 |
| 4,140,649 | 2/1979 | Bossert et al. | 426/335 |

FOREIGN PATENT DOCUMENTS

| | | | |
|---|---|---|---|
| 561924 | 8/1958 | Canada | 426/240 |
| 62-100241 | 5/1987 | Japan | 426/240 |

*Primary Examiner*—George Yeung
*Attorney, Agent, or Firm*—Peter Gibson

[57] ABSTRACT

A method is described herein to disinfest, decontaminate and extend the shelf life of shellfish by using an open-end system where trawled shellfish are placed on a computer controlled conveyor belt after being washed with seawater. Shellfish are then transported into pressurized treatment tanks that contain either gas or gas molecules (i.e., 1-ascorbic acid). After exiting the tank the shellfish are automatically placed in rows on a conveyor belt for their controlled, sequential irradiation. The shellfish then enter the irradiation chamber in the presence of carbon dioxide and it is then irradiated with machine generated electron beams. Upon completion, the shellfish exit the irradiation chamber via a conveyor belt and are then transported to an agitated continuous flow depuration tank that is equipped with ultra-sonification devices. The shellfish remain in these tanks until arrival at the port.

26 Claims, 3 Drawing Sheets

METHOD FOR REDUCING CONTAMINATION OF SHELLFISH

BACKGROUND OF THE INVENTION

Field of the Invention

This invention relates to the use of low dose radiation sources to process shellfish (mollusks and Crustacea) on board ship. Investigations were conducted on the radiation preservation of shrimp using organoleptic, biochemical, and microbiological tests as indices of product quality.

This invention relates to a method for controlling and reducing populations of foodborne pathogens in shellfish using low dose sources of radiation on board ship.

This invention also relates to the design of a shipboard shellfish processing facility that will use machine generated electron beam technologies to decontaminate, disinfest and extend the shelf life of mollusks and crustacean shellfish by reducing or eliminating the spoilage microflora, e.g., pseudomonas, psychotrophic spoilage organisms, the vibrio, salmonella, listeria and Botulism spoilage microorganisms. These microorganisms, with the exception of botulism, are among the most radio-sensitive microbial species (Thornley, 1963).

Linear accelerators, usually call "linacs," are electric machines producing high energy electron beams. These electrons penetrate the products of some centimeters to 80 centimeters, according to the density of the product. The linear accelerators is composed of a control system, a modulator, a hyper-frequency generator, an accelerating section and a scanning device. The modulator, power-supplied by main power, sends pulses to the klystron which generates hyper-frequency waves. The hyper-frequency waves are injected in the accelerating section in the same time as electrons generated by an electron gun. The electrons are accelerated by an electric field created by hyper-frequency waves and reach an energy of 5–10 MeV. Electromagnetic radiation in this range of energy encompasses both X-Rays and Gamma Rays generated by machines possessing 5 MeV and 10 MeV particle energy capacities respectively. Electromagnetic radiation in this range of field power encompasses both x-ray and gamma rays generated by machines of 5 MeV and 10 MeV maximum field strength, respectively. The accelerated electron beam is scanned over the product, penetrates it and deposits its energy in order to sterilize, decontaminate or disinfect (U.S. Pat. No. 2,858,441—Gale and U.S. Pat. No. 2,729,748—Robinson). It is known that radio-pasturized or sanitized foodstuffs can be processed without flavor degradation by subjecting the product to an atmosphere of carbon dioxide under super atmospheric pressure and exposing the product to low or even high doses of radiation. Accordingly, it is the object of this invention to provide a simple and efficient process for irradiating shellfish on board ship while preventing the development of off flavors, discolorations and spoilage (U.S. Pat. No. 3,483,005—Urbain, et al).

During the treatment, all operations parameters are controlled and recorded by a control computer. This process reduces computer computation time and identifies those essential variable which must be specified (design variables) in order to obtain a solution.

The following is a list of shellfish that may be effectively irradiated for vibrio and pseudomonas decontamination:

| | REQUIRED DOSES |
|---|---|
| MOLLUSC, BIVALVE MOLLUSC | |
| A. Clams | |
|   1. Soft-shelled clams (*mya arenaria*) | 2 kGys |
|   2. Surf clams (*spisula solidissima*) | 2 Kgys |
| B. Oysters | |
|   1. Gulf Oysters (*crassosteria virginica*) | 2 kGy |
|   2. Florida Oysters (*crassosteria virginica*) | 1–2 Kgy |
|   3. Pacific Oysters (*crassosteria gifas*) | 1–2 kGy |
|   4. Oysters (no species stated) | 2 kGy |
| C. Scallops | |
|   1. Sea Scallops (*placopecten magellanicus*) | .75 kGy |
|   2. Alaskan Scallops (*pectren caurinus*) | |
| CRUSTACEANS | |
| A. Crabs | |
|   1. Dungeness crabs (*cancer Magister*) | 2–3 kGy |
|   2. King crab (*paralithodes camtschatica*) | 1–2 kGy |
|   3. crabs (no species indicated) | 1–2 kGy |
| B. Lobsters | |
|   1. American lobster (*Homarus americanus*) | 1 kGy |
|   2. European lobster (*Homarus gammarus*) | 1 kGy |
|   3. Norwegian lobsters (*Nephrops norvegicus*) | 1 kGy |
| C. Shrimp | |
|   1. White shrimp (*penacus setiferus*) | 1–2 kGy |
|   2. Brown shrimp (*homarus gammarus*) | 1.5 kGy |
|   3. European brown shrimp (*crangon vulgaris*) | 1.5 kGy |
|   4. Pink shrimp (*panaeus duorarum*) | 1–2 kGy |
|   5. Shrimp (*metapenaeus affinis, penaeus indicus* and *parapeneopsis stylifera*) | 1–2 kGy |
|   6. Shrimp (no species indicated) | 1–2 kGy |

Headed, unshelled shrimp, for example, have been treated with one, two or three kGy on board ship; then placed on ice. Removal of the heads on shrimp before irradiation and depuration is recommended because tests have proven up to 75% of the bacteria are contained in the head. The shelf life of the product was ten to twenty days [(1) Novak, et al], a considerable extension of the storage life at refrigerator temperature above freezing. The energy requirements for freezing are greater than low dose treatments (Brynjolfsson, 1978). This would do away with the costs of freezing, storage and defrosting—resulting in ancillary energy savings. Since shrimp tend to deteriorate on board ship, the application of ionizing radiation to this product should preferably be carried out on ship [(3) and (4) Ronsivelli, et al].

EFFECT OF STORAGE TEMPERATURE

The storage life of radiopasteurized seafood depends on a number of factors which include the initial concentration of microorganisms at the time irradiation, the qualitative and quantitative composition of the microbial flora, packaging method, absorbed dose, the presence or absence of microbial inhibitors and the storage temperature. The last factor is extremely important. It is well documented that the rate of spoilage of fresh fish is much less over an increment of temperature in the vicinity of the freezing point compared to the same increment at higher temperatures. There is much published data which indicate that the shelf life of low-dose irradiated seafood was approximately doubled when the storage temperature was decreased 9° F. (5° C.) from 42° F. (5.6° C.) to 33° F. (0.6° C.). The effect of lowering the holding temperature is to increase the length of the lag phase and the generation time for psychrophiles. Irradiation has a similar effect on the lag phase. Perhaps the two treatments applied concurrently act synergistically since it is acknowledged that the post irradiation temperature has an influence on the survival of injured bacterial cells (2).

BIOLOGICAL CONTAMINANTS

Non-pathogenic bacteria—pseudomonads, reduced trimethylamine oxide to trimethylamine, which is responsible for producing the fishy odor of stale fish, producing hydrogen sulfide, ammonia and other compounds that collectively constitute spoilage (Ronsivalli, et al, 1982).

Chemical tests to measure the quality of fish are usually based on the concentration of these metabolic products in fish flesh. Irradiation treatments that eliminate pseudomonads cause a shift in the microflora which is usually less active metabolically (Spinelli, et al, 1964, 1965, 1969).

The accumulations of hypoxanthine, which depends on nucleotide degeneration by autolytic enzymes, is independent of bacterial flora and is a useful tool for assessing autolytic enzymanic reaction.

With regards to the carcinogenicity and toxicity from ingestion of seas food, none was reported in the results of animal feeding studies involving shrimp (Maurer, et al, 1961 and Phillips, et al, 1965).

Viruses are relatively radio resistant and it is not expected that a ionizing dose will effect any significant degree of reduction in their number. However, in contrast, the vibrio, cholera, vulnificus and parahaemolyticus are radiosensitive. For various strains inoculated in crab meat, a dose of 0.25 kGy caused a two to five log cycle reduction in number.

NON-SPORE FORMING PATHOGENS

Spore forming pathogens of concern in the fish irradiation industry would be members of the genus clostridium and, in particular, *c. botulinum*. Of the seven serological types identified, A, B, C, D, E and F have been isolated from fish, shellfish and marine sediment (Hobbs, et al).

The spores of Type E are less radiosensitive than types A or B. Thus control of botulinum in low dose irradiated fish or shellfish would have to be through temperature control or in the presence of a chemical inhibitor (U.S. Pat. No. 3,401,044—Corlett et al).

After passing from the irradiation chambers, shellfish may be delivered via a conveyor belt system to recirculating sterilized water tanks while being transported back to port. This computer controlled conveyor system is designed for the sequential irradiation of a plurality of products comprising the steps of forming said products into a row, carrying said product into a zone of irradiation by moving said products along said row, stopping successive products in said zone at spaced stop positions, for a pre-determined period of time and continuing the movement of said product along the axis of said row until the product in said zones reach other positions (U.S. Pat. No. 3,192,054—Kuhl et al).

Recirculated radiation sterilized or ultra violet light sterilized (pressurized) water for wet storage (depuration) may be used while in transport on board the processing vessel or even in the port. A bivalve or crustacean ultrasonification depuration system can simply consist of a pump for continuous flow of pressurized gases or gas molecules (Possell, 1980), i.e., 1-ascorbic acid, its analogues and or its isomers (U.S. Pat. No. 2,832,689—Proctor, et al) emersed in water; this enhances the cavitation and the subsequent microbial destruction (Hayden, et al). The system also includes tanks with motor driven impellers, with multistaged egress ports and an angled bottom adapted to direct materials into said water return means (U.S. Pat. No. 3,641,982—Woodridge). Fluids should be pressurized between 5 TORR and 500 TORR.

This invention also relates to the use of computer enhanced depuration equipment that will regulate particulate dissociation by using harmonic frequency energy to promote cavitations (chemical reaction) by separating biocontaminates from radiation processed sea water. Ultrasonic (sonification) processing will be controlled by on line real time computers. Dissociation processing operates with harmonic frequencies, which are selected on the basis of the biocontaminants to be manipulated. The exact frequencies are chosen to be complementary to the harmonic and wave energy. Each element selected for dissociation is matched and polarized with its resonant frequency. The process can be continuous flow and does not use additives or chemicals. Dissociation processes are designed to cause bio-contaminants and other marine sediments to rapidly cohere and precipitate. A treatment of a liquid or slurry which combines the effect of heat, ultrasonification and pressure will produce an effective bactericide. The residue is carbonaceous. Another advantage of the process is that it is inter-related with monetary savings, speed, compactness and element adaptability. The temperature necessary to achieve sterility was 111° F. (U.S. Pat. No. 5,026,564—Hayden); considerably lower than conventional methods for achieving product sterility. Ultrasonification should be of an intensity of 3 watts per $cm^2$ to 30,000 watts per $cm^2$ and at a frequency of 500 kHz to 50 mHz.

In describing a plant processing design, variables can be either input (i.e., raw material flow rate), output (i.e., product purity) or equipment variables (i.e., operating and storage temperatures). By using mathematical algorithms, the shellfish processor can choose a set of design variables in such a way so as to minimize the amount of iterative computations necessary. Based on the design variables, the computational sequence (which equation to use to solve for a particular variable and in what sequence) is specified. The present process can handle either explicit or implicit interactives involving for the iterative variable (Lee and Rudd, "On the Ordering of Recycle Calculations," AICHE Journal, Vol. 12, No. 6, pp 1184, Nov. 1966).

SUMMARY OF THE INVENTION

Generally speaking, the extended shelf life of shell fish with low dose radiation depends on a number of factors; one being the initial quality of the product which is optimal at the time of capture and others include storage conditions and temperature. From this fact, it could be deducted that it would be advantageous to irradiate seafood on board ship immediately after capture. Independent studies were conducted by the Board of Commercial Fisheries on board vessels equipped with irradiation sources. The MV Delaware of the East Coast (Carver, et al, 1969), the MV Miller Freeman on the West Coast of the United States (Teeny, et al, 1970) and the U.S.S. Oregon (Novak et al, 1968). Soon after shrimp are landed on deck, they generally die. Microbial spoilage starts immediately through marine bacteria on the surface or through microorganisms that happen to contaminate the shrimp on deck (1). It was therefore concluded that seafood irradiated immediately after netting while still pre-rigor had the longest storage life and best quality. Machine-generated electron beams can effectively deliver a dose capable of reducing foodborne spoilage pathogens (i.e., the vibrio, listeria, salmonella and *c. botulinum*) without the mechanical problems associated with a hot source, i.e., a radionuclide (Urbain;, 'A Giant Step Beyond Appert', *Nutrition Today*, Jul., 1984), such as Cobalt 60.

Although the optimal dose that gives the longest shelf life extension without altering the characteristics for most species of seafood is 1.5 kGy to 2.5 kGy, it should be emphasized that inactivation of *Clostridium Botulinum* types A through F & G can be controlled at higher sub-sterilizing doses of 2 to 3 Megarads with the addition of chemical inhibitors and temperature control. A seaborne irradiation vessel could achieve these goals. It was also concluded that Irradiation of seafood at more than seven days past mortem is not recommended (Ampola, et al, 1969).

Computer enhanced wet storage (recirculating pressurized) sterilized water tanks equipped with ultrasonification equipment offers the best solution for decontamination of shellfish harvested from contaminated water as well as temporary storage on land.

EXAMPLE I

In a study designed to determine the radicidation dose for salmonella in frozen shrimp, the total bacterial count of the product was found to range from 2.3×10⅝–3×10⅛ per gram. Freezing the shrimp lowered this count by a factor of 10 and irradiation of the frozen shrimp with 300 krad effected a further 100 fold reduction. *Vibrio Parahaemolyticus,* which was initially present in 85 percent of the samples, was eliminated with a dose of 200 krad. D10 values for 5 serotypes of salmonella artificially inoculated into shrimp ranged from 40–60 krad. These values seem low for salmonella in frozen shrimp in view of the fact that a D10 value of about 75 krad was reported for several salmonella serotypes in the non-frozen shrimp and it is known that bacterial cells are more radio resistant in the frozen state. The D10 values for salmonella in other frozen flesh foods is of the order of 100 krad. In frozen horse meat, the D10 value for 3 serotypes ranged from 93–128 krad. In another study with poultry, the D10 value for irradiation in the frozen state was 100 krad compared to 70 krad at 0°, and was 2.8 times greater in comminuted meat (anaerobic condition) compared to surface contamination (aerobic condition). It is therefore acknowledged that if the salmonella are on the surface of the shrimp, the D10 will be less if the frozen shrimp are irradiated loosely in a package as IQF compared to being irradiated in a frozen solid block form. Since it is now considered that the radioresistance of salmonella in frozen shrimp would be much different from that in frozen poultry or horse meat, a D10 value of 100 krad could be assumed for the shrimp.

The parameters for computing a minimum dose for salmonella radicidation are: 1) the D10 value for the most radioresistant serotype to be found in the product; 2) the initial contamination level; and 3) the degree of freedom from salmonella desired. The ICMSF has recommended a specification for salmonella in frozen seafood of no positive samples in five 25 g sub samples. This would essentially mean no salmonella in 125 grams. To meet this requirement, the desired degree of freedom from salmonella could be set at 0.1 cell in 125 grams. Although the initial level of contamination with salmonella would have to be determined for each processing plant (since some may be more hygienic than others), a conservative estimate would be 10 cells per gram. Thus, the initial load in a 125 g samples would be 1250 cells. This would have to be reduced to 0.1 or less. With a D10 value of 100 krad, a dose of about 400 krad would be necessary. If the initial contamination level is shown to be consistently less than 10 cells per grams, a lesser dose could be used (2).

The superiority of the shipboard irradiation process can be seen when FIG. 2 is compared with FIG. 3. The shrimp reported on in FIG. 3 were caught by the Oregon, but were treated in the same manner as the control (i.e., non-irradiated). They were, however, irradiated at 100, 200 and 300 krad in the irradiation chamber of the Louisiana State University Nuclear Science Center four days after harvesting. These samples, while much lower in microbial count than the control, were noticeably inferior in this respect to the shipboard irradiated samples. This illustrates the great importance of irradiating shrimp soon after harvesting (1).

BRIEF DESCRIPTION OF THE DRAWING

Other objects, features and advantages of this invention will be apparent from a study of the written description and the drawing in which:

FIG. 1 is a labeled schematic or flow diagram depicting a preferred embodiment of principles relating to the present invention illustrating the sequential steps involved in an optimal shellfish decontamination process.

FIG. 2 is a calibrated graphic representation of the effect of the level of irradiation upon the microbial contamination of shrimp measured in a count of microbial colonies per gram immediately after catching.

FIG. 3 is a calibrated graphic representation of the effect of the level of irradiation upon the microbial contamination of shrimp measured in a count of microbial colonies per gram after 4 days storage on ice.

DESCRIPTION OF THE PREFERRED EMBODIMENT

Referring now specifically to FIG. 1, a flow diagram is shown in which the present invention may be seen to be an open end system where trawled shellfish are placed on a computer controlled conveyor belt after being washed with sea water. Shellfish are then transported into pressurized treatment tanks that contain either gas or gas molecules (i.e. 1-ascorbic acid). After exiting the tank the shellfish are automatically placed in rows on a conveyor belt for their controlled, sequential irradiation.

The product then enters the irradiation chamber in the presence of carbon dioxide and it is then irradiated with machine generated electron beams. Upon completion, the product exits the irradiation chamber via a conveyor belt and is then transported to an agitated (impeller) continuous flow depuration tank that is equipped with ultrasonification devices. The product remains in these tanks until arrival at the port (or beyond).

Obviously many modifications and variations of the invention as hereinbefore set forth may be made without departing from the spirit and scope thereof and therefore only such limitations should be imposed as are indicated in the appended claims.

I claim:

1. A method for reducing contamination of shellfish via the dissociation of living bacteria and depuration comprising:

the step of transporting shellfish into a suitable environment for initial, macroscopic cleansing;

the step of initial, macroscopic cleansing of said shellfish;

the step of transporting the initially cleansed shellfish to a suitable environment for irradiation;

the step of irradiating a predetermined maximum amount of said initially cleansed shellfish whereby said quantity of shellfish is exposed to a controlled source of radiation thereby microscopically cleansing said shellfish through the disassociation of bacteria by the energy transmitted by said irradiation;

the step of transporting the initially cleansed, irradiated shellfish into a suitable aqueous environment for depuration of said shellfish;

the step of purging said initially cleansed, irradiated shellfish in an appropriate aqueous environment wherein ultrasonic waves are maintained thereby accelerating depuration of said shellfish through stimulus of shellfish metabolic processes and the facilitation of the precipitation of disassociated bacteria and other organic contaminants by the action of cavitation caused by the relative pressure differentials within said aqueous environment produced by the maintenance of ultrasonic waves.

2. A method comprising the steps described in claim 1 and further including the step of sensitization of said initially cleansed shellfish prior said step of irradiation wherein a predetermined quantity of said shellfish is immersed in an aqueous environment treated by suitable means to sensitize said bacteria to exposure to radiation thereby reducing the level or irradiation required to disassociate said bacteria.

3. The method described in claim 2 wherein said suitable means of sensitization consists of a gaseous addition to said aqueous environment.

4. The method described in claim 3 wherein said gaseous addition consists substantially of carbon dioxide.

5. The method described in claim 4 wherein said gaseous addition consists substantially of ozone.

6. A method comprising the steps described in claim 3 and further including the step of pressurizing said aqueous environment above ambient atmospheric level thereby accelerating the action of sensitization of said bacteria by said gaseous addition through the increased dispersion of said gaseous addition throughout said aqueous environment.

7. A method comprising the steps described in claim 1 and further including the step of sensitization of said initially cleansed shellfish prior to said step of irradiation wherein a predetermined quantity of said shellfish are contained in a gaseous environment treated by suitable means to sensitize said bacteria to exposure to radiation thereby reducing the level or irradiation required to disassociate said bacteria.

8. The method described in claim 7 wherein said gaseous environment includes a substantial proportion of carbon dioxide.

9. The method described in claim 7 wherein said gaseous environment includes a substantial proportion of ozone.

10. The method described in claim 7 and further including the step of pressurizing said gaseous environment to a level above that of the ambient atmospheric pressure.

11. A method comprising the steps described in claim 1 and further including the step of sensitization of said initially cleansed shellfish during said step of irradiation wherein a predetermined maximum limit of said shellfish are contained in a gaseous environment treated by suitable means to sensitize said bacteria to exposure to radiation thereby reducing the level of irradiation required to disassociate said bacteria.

12. The method described in claim 11 wherein said gaseous environment includes a substantial proportion of carbon dioxide.

13. The method described in claim 11 wherein said gaseous environment includes a substantial proportion of ozone.

14. The method described in claim 11 and further including the step of pressurizing said gaseous environment to a level above that of the ambient atmospheric pressure.

15. The method described in claim 1 wherein said controlled source of radiation comprises a shielded radionuclide.

16. The method described in claim 1 wherein said controlled source of radiation comprises a machine generated source of radiation.

17. The method described in claim 16 wherein said machine generated source of radiation comprises a machine generated electron beam.

18. The method described in claim 16 wherein said machine generated source of radiation consists of an X-ray of 5 MeV maximum energy.

19. The method described in claim 16 wherein said machine generated source of radiation consists of a Gamma ray of 10 MeV maximum energy.

20. The method described in claim 16 wherein ozone is produced as a by product of said machine generated source of radiation and said ozone is utilized as an agent in the sensitization of bacteria to irradiation.

21. A method comprising the steps described in claim 1 and further including the step of exposing said shellfish after said irradiation to an agent which functions as a free radical acceptor.

22. A method comprising the steps described in claim 1 and further including the step of fortification of said shellfish after said irradiation wherein lost nutrients are replenished by the addition of supplementary nutrients.

23. A method comprising the steps described in claim 1 and further including the step of exposing said shellfish after said irradiation to ascorbic acid whereby the loss of nutrients effected by irradiation is ameliorated by the reduction of free radicals and adsorption of vitamins facilitated by the agency of said ascorbic acid.

24. A method comprising the steps described in claim 1 and further including the step of limiting said controlled source of radiation to a strength of 3 kGy, thereby disassociating spoilage bacteria and avoiding any further damage to the shellfish associated with higher levels of radiation.

25. A method comprising the steps described in claim 1 and further including the step of limiting said controlled source of radiation to a strength of 3 Mrad, thereby disassociating *Clostridium Botulinum* and avoiding any further damage to the shellfish associated with higher levels of radiation.

26. A method wherein all the steps of claim 1 are carried out continuously utilizing a conveyor system in the transport of said shellfish.

* * * * *